(12) United States Patent
Huang et al.

(10) Patent No.: US 12,413,509 B2
(45) Date of Patent: Sep. 9, 2025

(54) APPLICATION-AWARE LINKS

(71) Applicant: Cisco Technology, Inc., San Jose, CA (US)

(72) Inventors: Chih-Tsung Huang, Burlingame, CA (US); Wei-Jen Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/532,290

(22) Filed: Dec. 7, 2023

(65) Prior Publication Data
US 2024/0106737 A1     Mar. 28, 2024

Related U.S. Application Data

(63) Continuation of application No. 16/011,302, filed on Jun. 18, 2018, now Pat. No. 11,882,024.

(51) Int. Cl.
*H04L 45/28*     (2022.01)
*H04L 43/0817*     (2022.01)
(Continued)

(52) U.S. Cl.
CPC .......... *H04L 45/28* (2013.01); *H04L 43/0817* (2013.01); *H04L 43/16* (2013.01);
(Continued)

(58) Field of Classification Search
CPC ..... H04L 45/123; H04L 45/308; H04L 45/70; H04L 45/02; H04L 45/00; H04L 45/28;
(Continued)

(56) References Cited

U.S. PATENT DOCUMENTS 5,136,591 A     8/1992    Krause
5,490,168 A     2/1996    Phillips et al.
(Continued)

OTHER PUBLICATIONS

"Application-Aware Routing," viptela, May 24, 2018, pp. 1-5.
(Continued)

*Primary Examiner* — Sudesh M. Patidar
(74) *Attorney, Agent, or Firm* — Polsinelli P.C.

(57) ABSTRACT

The present technology is directed to a system and method for application aware management and recovery of link failures resulting from excessive errors observed on the link. One aspect of the proposed technology is based on identification of link errors associated with application-specific data patterns traversing link. Other aspects involve corrective actions based on relocation or modification of specific application traffic to thereby alleviate the observed excessive link errors and prevent a link failure or shut down. Relocation may involve moving the source application to a different virtual machine/container/physical device or rerouting application traffic by updating relevant routing protocols. Modification may involve harmlessly changing payload data pattern to remove data-pattern dependent signal attenuation. Information corresponding to identified faulty payload data patterns and associated frame data quality parameters maybe stored and utilized to provide analytics evaluation of network wide physical resource issues that maybe affecting application traffic.

20 Claims, 6 Drawing Sheets

(51) Int. Cl.
*H04L 43/16* (2022.01)
*H04L 45/00* (2022.01)
*H04L 47/26* (2022.01)
*H04L 45/302* (2022.01)

(52) U.S. Cl.
CPC .............. *H04L 45/22* (2013.01); *H04L 47/26* (2013.01); *H04L 45/306* (2013.01)

(58) Field of Classification Search
CPC ......... H04L 45/04; H04L 45/08; H04L 45/14; H04L 45/22; H04L 45/306; H04L 45/30; H04L 45/38; H04L 43/0823; H04L 43/16; H04L 43/0817; H04L 43/0811; H04L 47/10; H04L 47/12; H04L 47/26; H04L 47/2475; H04L 47/122; H04L 47/127; H04L 47/25; H04L 47/32; H04L 47/365; H04L 41/16; H04L 41/069; H04L 41/0668; H04L 69/40; H04J 1/16; H04W 28/0236; H04W 28/231; H04W 28/02; H04W 28/0268; H04W 28/0289; H04W 28/04; H04W 28/0992; H04W 28/09
See application file for complete search history.

(56) References Cited

U.S. PATENT DOCUMENTS

| | | | |
|---|---|---|---|
| 7,672,222 B2 | 3/2010 | Lesartre | |
| 8,953,441 B2 | 2/2015 | Nakil et al. | |
| 2004/0090916 A1 | 5/2004 | Hosein | |
| 2004/0209635 A1 | 10/2004 | Hsu et al. | |
| 2006/0285489 A1 | 12/2006 | Francisco et al. | |
| 2009/0019505 A1* | 1/2009 | Gopalakrishnan | H04L 1/1838 725/109 |
| 2011/0267951 A1 | 11/2011 | Stanwood et al. | |
| 2012/0079101 A1* | 3/2012 | Muppala | H04L 63/1425 709/224 |
| 2013/0124911 A1 | 5/2013 | Griffith et al. | |
| 2013/0163407 A1 | 6/2013 | Sinha et al. | |
| 2014/0204743 A1 | 7/2014 | Garcia et al. | |
| 2015/0063347 A1* | 3/2015 | Kadakia | H04L 65/1053 370/352 |
| 2015/0085694 A1 | 3/2015 | Agarwal et al. | |
| 2015/0146675 A1 | 5/2015 | Zhang et al. | |
| 2015/0222361 A1 | 8/2015 | Dhaini et al. | |
| 2016/0182383 A1* | 6/2016 | Pedersen | H04L 45/24 709/226 |
| 2016/0254990 A1 | 9/2016 | Koktan | |
| 2016/0366189 A1 | 12/2016 | Hart et al. | |
| 2017/0026292 A1 | 1/2017 | Smith et al. | |
| 2017/0142665 A1 | 5/2017 | Tabet et al. | |
| 2017/0302567 A1 | 10/2017 | Lan et al. | |
| 2017/0303159 A1* | 10/2017 | Ma | H04L 1/0001 |
| 2017/0366441 A1 | 12/2017 | Hill et al. | |
| 2018/0196710 A1 | 7/2018 | Iyer et al. | |
| 2018/0317121 A1 | 11/2018 | Liao et al. | |
| 2019/0215716 A1 | 7/2019 | Chakraborty et al. | |
| 2021/0022123 A1* | 1/2021 | Nakao | H04W 76/28 |
| 2023/0208775 A1* | 6/2023 | Sze | H04W 28/10 370/235 |

OTHER PUBLICATIONS

International Preliminary Report on Patentability for International Application No. PCT/US2019/037340, mailed Dec. 30, 2020, 9 pages.

International Search Report and Written Opinion for International Application No. PCT/US2019/037340, mailed Sep. 2, 2019, 10 pages.

Office Action for Canadian Application No. 3103276, dated Nov. 10, 2023, 5 Pages.

* cited by examiner

APPLICATION-AWARE LINKS

CROSS REFERENCE TO RELATED APPLICATIONS

This application is a continuation of U.S. application Ser. No. 16/011,302, filed on Jun. 18, 2018, entitled APPLICATION-AWARE LINKS, which is hereby incorporated by reference in its entirety.

TECHNICAL FIELD

The present technology pertains to improving network connectivity performance and link utilization for computer-based applications. More specifically it is directed to application level management and recovery of link failures and link analytics.

BACKGROUND

All computer-implemented applications communicate through computers, networking and storage devices. The backbone interconnecting all such devices, over which application data traffic is transmitted, is comprised of plurality of physical and/or logical links. Error conditions occurring on these links are monitored and when a pre-determined error threshold on a particular link is exceeded, the link is shut down. As a consequence all data traffic traversing the link is also shut down.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
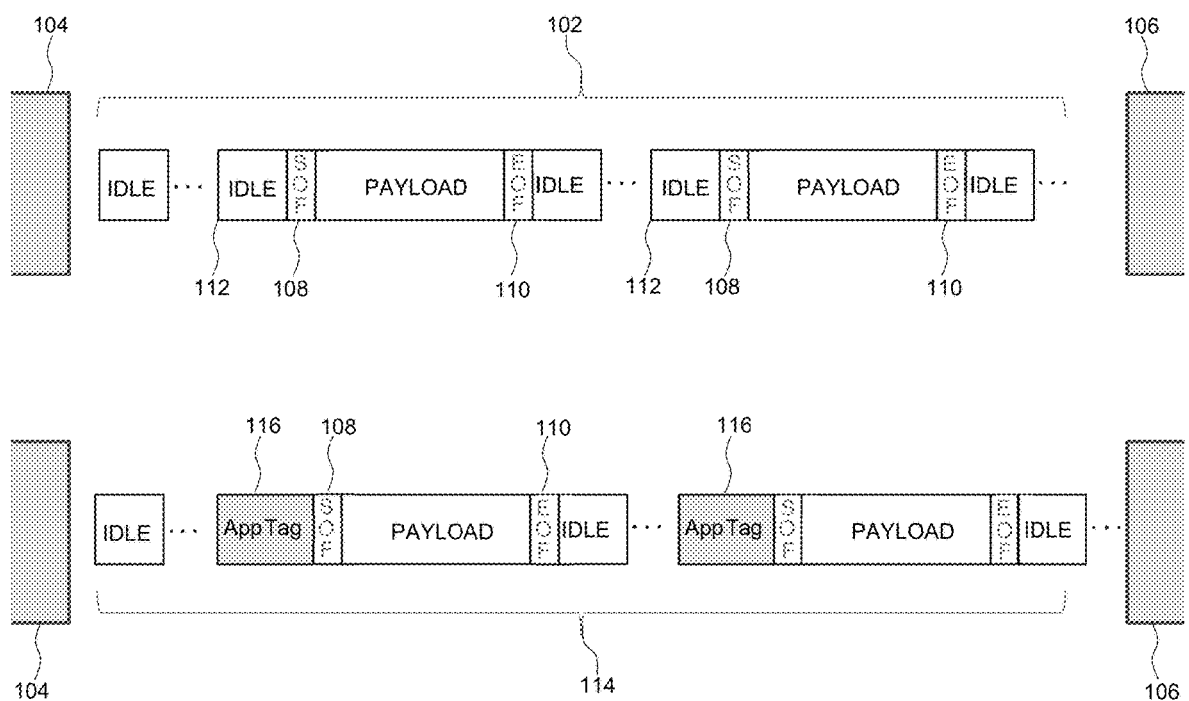
FIG. 1 illustrates an exemplary transmission data frame with source application tagging, in accordance to one embodiment of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and devices are disclosed and directed to application level monitoring and analysis of error conditions on network links to identify link failures that may be attributable to specific payload data patterns associated with particular source application. Subsequent recovery actions, as disclosed by embodiments of the technology, may then be directed to modifying or relocating the specific traffic streams over to one or more different paths which would leave the network link intact for several other applications that may be transmitting over it. Aspects of the technology are further directed to storing error causing payload data patterns along with frame data quality parameters and utilizing the stored information to perform link analytics and facilitate discovery of physical resource problems impacting application traffic. It should be noted that, for the purposes of the current technology, a link generically refers to any means of providing data transport between network/computing devices. For example a link may represent an Ethernet, Optical Transport Network (OTN), Synchronous Optical Networking (SONET), Synchronous Digital Hierarchy (SDH) or any other transport protocol as would be known to a person of ordinary skill in the art.

Example Embodiments

Disclosed are systems, methods, and non-transitory computer-readable storage media for application aware links capable of identifying various traffic streams traversing a link at the application level and taking subsequent corrective measures by targeting specific application's data traffic in order to alleviate the error condition observed on a link. Embodiments of the technology are further directed to monitoring, storage and analysis of information with regards to error causing payload data patterns along with frame data quality parameters to provide a forensic analysis of link connectivity performance across the network. In addition to improving network link utilization and up time, aspects of the technology also provide application level link analytics to extend application continuity (i.e. application movement or application modification). The gained analytics insight may be used to predict and plan corrections of connectivity failures and provide coordinated hardware updates. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Network link errors have been generally attributed to physical or logical discontinuities in the transmission of information. Therefore an excessive number of errors, exceeding a certain threshold, have conventionally been indicative of a faulty link and under such conditions a network link is either automatically or manually shut down. Other areas of study are related to software errors and/or misconfigurations that may cause over-utilization of a link, resulting in excessive accumulation of errors and consequent loss or failure of the link. In many previous studies directed at performance of network links for electronic transmission of information the cause of link failure whether identifiable or not has not featured significantly in performance recovery implementation.

Previously proposed remedies are primarily directed to controlling or reducing number of errors in data transmission by utilizing various encoding techniques such as Forward Error Correction (FEC). Such remedial techniques are generally based on the central idea of encoding the message in a redundant way by using an error-correcting code. The redundancy allows the receiver to detect a limited number of errors that may occur anywhere in the message, and often to correct these errors without retransmission. This however is an attempt at reducing network link errors. Moreover, such techniques are applied to the aggregate traffic traversing the link, which may add significant costs to area, power and latency involved in the implementation of it. Furthermore much of the error on a link may go undetected by such techniques. Other strategies may involve duplication of transmission such that two identical data streams are transmitted across interconnecting links. However, in a bi-connected network such as this, each network node or switch requires two transceivers. This technique would double the transmission hardware and may require additional processing cycles at each termination point.

With a move towards multi-tenant data centers and popularity of cloud-based networking environments, aggregate data traffic traversing a network link may be increasingly comprised of several distinct transmission streams associated with multiple source applications. Yet, the error performance or reliability of network links is almost always considered in the context of aggregate traffic traversing the network link. Therefore, whether expressed over time, or instantaneously, or as a rate or count parameter, a network link error/fault condition is almost always determined on the basis of the aggregate errors, and monitored as such. Consequently a link is shut down if observed aggregate errors on the link exceed a pre-determined threshold, thus taking down link connectivity for all source applications that may be transmitting over the link.

One aspect of the present technology puts forth the premise that the behavior of some applications, for example specific bit pattern in a payload of an application data frame, may result in apparent link errors whilst the behavior of other applications may not demonstrate errors. Therefore, according to an embodiment of the present technology, under such conditions relocation of application traffic onto a different transmission path or bit pattern modification of application payload, associated with observed link errors, may result in mitigation of the reported link errors. Therefore, a more granular analysis of link error condition based on differentiating among multiple application-specific transmissions traversing the link may prevent unnecessary link shut down and connectivity failures that may have otherwise been avoided.

As posited above and in accordance to one aspect of the present technology, often times link errors are due to specific data patterns transmitted by a particular source application. Certain bit patterns undergo additional attenuation under non-ideal or noisy transmission link conditions. Such data pattern dependent signal attenuation may lead to bit flips in the payload bit stream thus contributing to the aggregate link error as observed by a terminating device. Therefore certain transmission errors, counted into the aggregate link errors are in fact associated only with a particular transmission sourced from a specific application. Such transmission errors may therefore be unrelated to and not indicative of connectivity performance or error conditions experienced by other applications that may be transmitting over the common link.

A total link shutdown as a result of excessive errors that may be narrowed to a particular source application is adverse to the overall network performance. In such cases, a more optimal course of action may involve moving the said source application to a different link/path or perhaps notifying the application that is causing that issue to take corrective actions instead of actually shutting down the link which will bring down all the applications transmitting over the link. This becomes particularly important when multiple applications are communicating over a common link.

FIG. 1 illustrates a general data transmission format 102 for communication across a link established, for example, between device 104 and 106. Transmission format 102 comprises frame delimiters such as Start Of Frame (SOF) indicator 108 and the End Of Frame (EOF) indicator 110 which identify the start and end of a frame, respectively. Transmission format 102 further comprises primitive signals that may be used to indicate events and actions. A primitive signal, corresponding to IDLE frames is denoted by element 112 in the transmission format 102. IDLE frames may be used to communicate status messages between communicating ports/devices. If no user-data is transmitted the ports may send IDLE frames. These are frames with some bit pattern that may be needed to maintain bit and word synchronization between two adjacent ports/devices. Additionally transmission of IDLE frame may fulfill a required standard corresponding to a minimum number of primitives required between frames.

FIG. 1 further illustrated an exemplary transmission format 114 wherein the IDLE frame 112, in front of the Start Of Frame indicator 108 is replaced with an application tag 116. In this way transmission 114 traversing a transmission link between 104 and 106 is tied to a source application and is distinguishable as such. In FIG. 1, exemplary transmission format/frame 114 is overloaded with an inline application Tag 116 in place of the IDLE primitive 112 in front of the SOF indicator 108. By allowing inline usage of the application tag 116 no extra bandwidth is taken up by the transmission format/frame 114.

It should be noted that inline insertion of an application tag in place of IDLE frame in a transmission stream, as illustrated in FIG. 1, represents one exemplary method of identifying source application for different transmission streams traversing a link. Embodiments of the present technology may involve other ways of identifying the source application corresponding to each data frame traversing a transmission link without application tag. For example, source application may be inferred from the encapsulated information in the data packet itself by examining any combination of layer 2, layer 3 or layer 4 or user defined payload data. Alternatively, identification of source application may be facilitated with an embedded in packet application tag. Other methods of facilitating differentiation of aggregate traffic over a link on a basis of corresponding source application may be apparent to a person of ordinary skill in the art.

Figure 2:
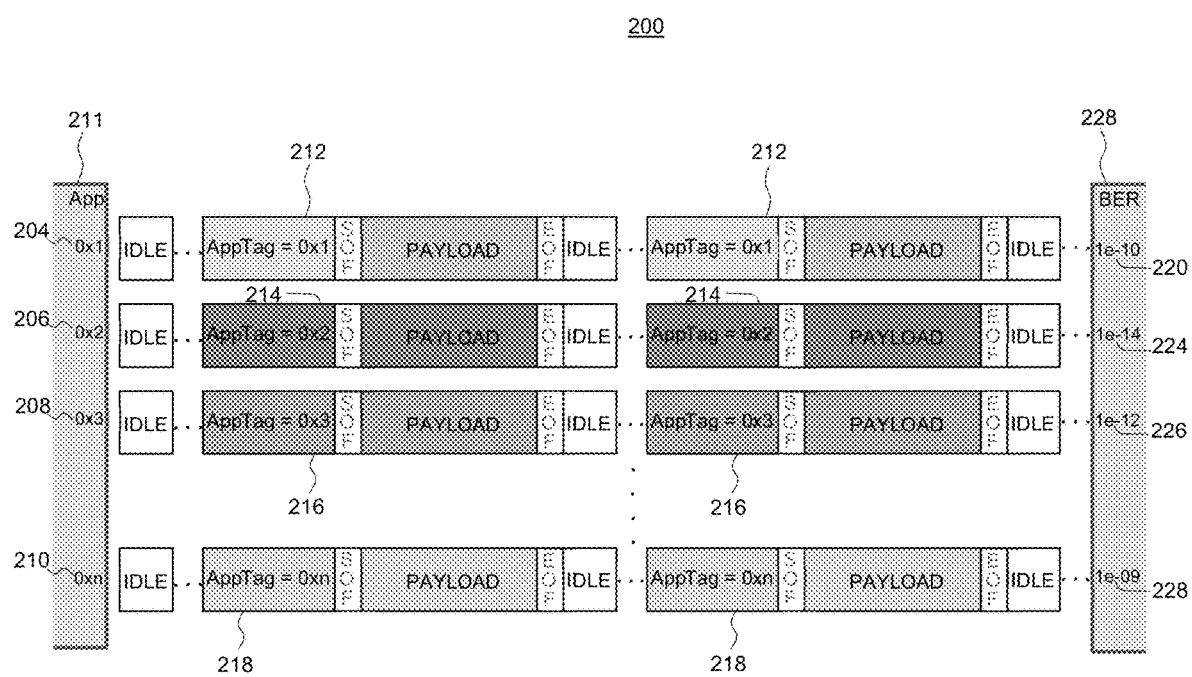
FIG. 2 illustrates application-level delineation and error monitoring for aggregate traffic traversing an application-aware link, in accordance with one embodiment of the present technology.

FIG. 2 illustrates an exemplary representation of aggregate traffic profile traversing an application-aware link 200 in accordance to an embodiment of the present technology. The aggregate traffic traversing the application-aware link 200 is differentiated on a basis of source application such that each distinct transmission stream traversing the link is tied to a specific source application as identified by an application tag inserted into each distinct transmission stream. Similarly, on the receiving end, an error monitoring mechanism is independently established for individual transmission streams such that an application specific transmission that may be disproportionately contributing to aggregate link errors may be quickly and accurately identified and appropriate corrective action taken. For example, with reference to FIG. 2, transmission streams from source applications 204, 206, 208 and 210 on the transmitting device end 211 of the application-aware link 200, as respectively identified by application tags 212, 214, 216 and 218, are tracked and monitored by dedicated Bit Error Rate counters 220, 222, 224, and 226 on the receiving device end 228 of the application-aware link 200.

In some embodiments, application traffic flow may be characterized by a presence of an application tag or the absence of an application tag to identify performance level of a particular link carrying traffic from one or more source applications.

Figure 3:
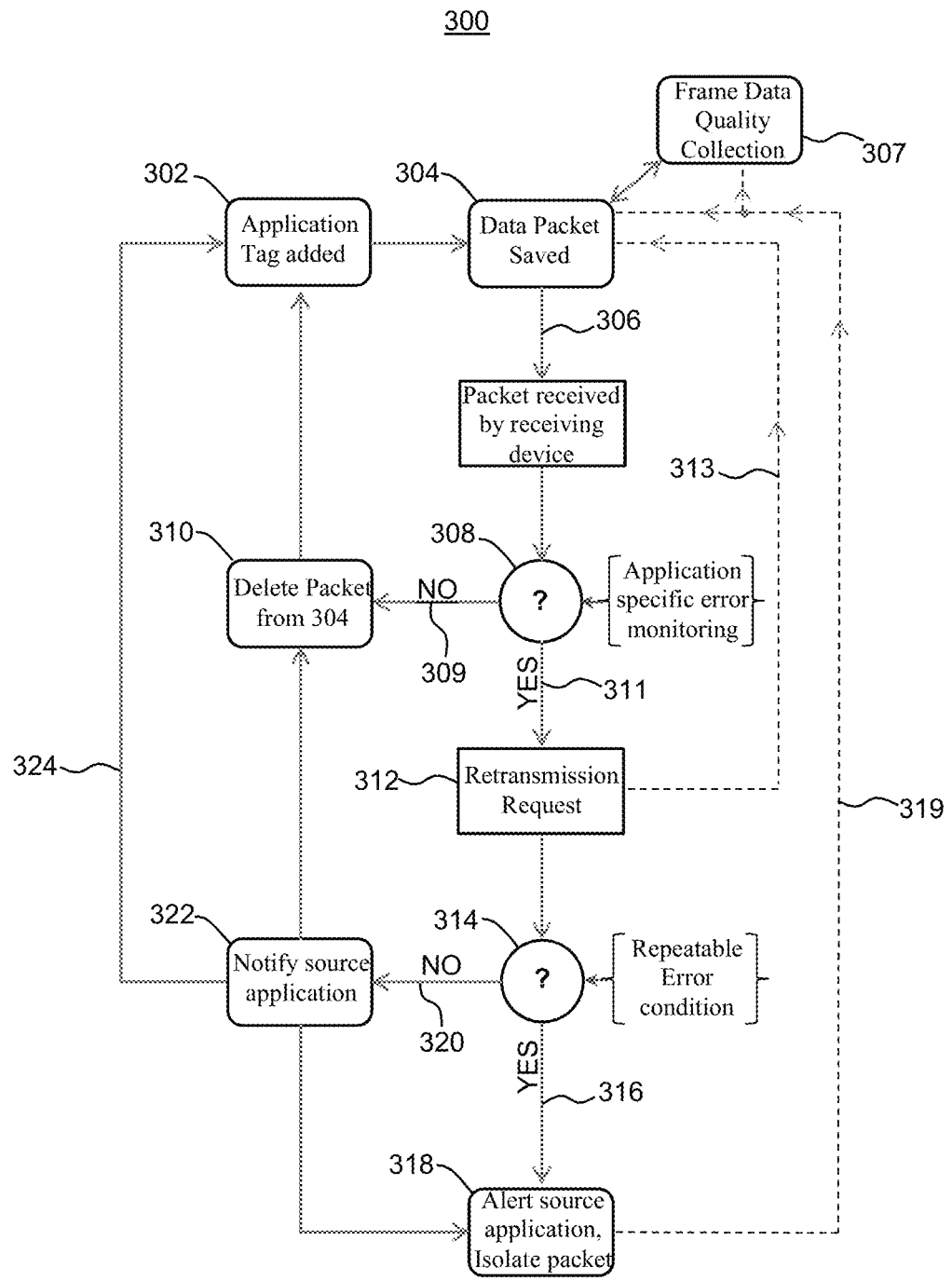
FIG. 3 illustrates a basic operational flow for performing link failure identification and recovery at the application level, in accordance to one embodiment of the present technology.

FIG. 3 illustrates an operational flow diagram 300 directed to an exemplary method of operation for an application-aware link, in accordance to an embodiment of the present embodiments. In accordance to the exemplary method 300, identification of a specific source application as a primary cause of excessive error condition on or failure of a transmission link may be followed by a set of corrective actions to both maintain link connectivity and initiate collection of forensic and diagnostic information on the said link for immediate or later analysis.

According to the exemplary method 300 in FIG. 3, application-specific traffic is tagged with a source application identifier at step 302. This may be accomplished, for example, by a transmitting device or host. Step 302 may involve, for example, inline usage of an application tag in the transmission frames corresponding to a specific application. A copy of the transmission packet(s) is then saved by the transmitting device at 304 and the packet is sent over a link to a receiving device/entity at 306. Subsequent to tagging the traffic, the transmitting device may start to collect frame data quality per each traffic flow associated with a particular application tag, as denoted by step 307 in the operational flow diagram 300.

At 308 a decision is made, for example by the receiving device, to initiate tracking of the link error performance relative to each distinct application tag in the incoming traffic. The decision at 308 may be based upon observation of a condition such as aggregate link errors exceeding a target threshold. According to one embodiment of the present technology, tracking of link error condition relative to each distinct application tag may be accomplished, for example, by tracking a dedicated bit error counter for each application specific traffic flow as identified by the application tag inserted in each transmission frame. In the exemplary method 300, link error condition is evaluated on a basis of Bit Error Rate (BER) that may be tracked using a BER counter.

If the outcome of application-specific error monitoring action initiated at 308 determines that condition 309, corresponding to Bit Error Rate (BER) being less than expected BER of the link, applies to specific application traffic, the operation moves to 310. At 310 a message comprising delete instruction of the packet(s) stored at 304 is sent to the transmitting device. This message may be inserted into the application tag, for example, corresponding to a format; AppTag=Delete packet stored at step 304. The stored packet is deleted at step 310 and operation moves back to 302.

However, if the outcome of application-specific error monitoring action initiated at 308 determines that condition 311, corresponding to Bit Error Rate (BER) being greater than the fault tolerance of the link, applies to specific application traffic, the operation is moved to step 312. At 312 receiving entity/device sends a request for retransmission of the packet(s) associated with excessive link to the transmitting device in order to verify repeatability of the error. For example, receiving entity/device may send a message 313 to the transmitting device comprising of |AppTag=Retransmit last packet stored in step 304|. Upon receipt of the retransmit request, the transmitting device retransmit packet(s) saved in step 304 to the receiving entity/device. At 314 the receiving device will determine the repeatability of the error condition in the retransmitted packet(s). If error condition 316, corresponding to retransmitted packet(s) having repeatable data errors is confirmed, the receiving device will send a message (i.e., AppTag=Repeatable Error) to the transmitting device to notify it about the observed repeatable excessive error condition. The receiving device deletes the received retransmitted packet and does not forward it. At this point the operation moves to 318 wherein the transmitting device moves the complete frame stored at step 304 and frame quality data from step 307, as indicated by 319, to a scratch space quarantined for analysis by a collector and marked as repeatable. The Collector may alert the application of repeatable error with high BER and requests the application to take a different path (i.e., alternative server Network Interface Card (NIC) if dual homed or move to a different Virtual Machine/Container.

If error condition 320, corresponding to retransmitted packet not having repeatable data errors is confirmed, the operation moves to 322 wherein the receiving device/entity will send a message to the transmitting device to notify it about the non-repeating error condition. Such a message, for example, may comprise AppTag=Not Repeatable Error. At this point the operation may move back to step 310, corresponding to the deletion of frame(s) stored by the transmitting device at step 304, or it may move to 318 wherein complete frame(s) from step 304 and frame quality data from step 307 stored for each application tag is moved to a scratch space quarantined for analysis by collector and marked as not repeatable.

In some embodiments, if a collector alerts a transmitting device (or a source application directly) of unrepeatable high BER condition, source application may choose or be directed to take a different path or it may treat the message as an informational event, depending on resource availability. Receiving entity/device may then delete the retransmitted packet and return to step 302, as indicated by 324. The decision to relocate application-specific traffic to a different path or modify application payload in response to repeatable high error condition message or to treat a non-repeatable high error condition message as informational may be made by the transmitting device, source application or a different control program.

It should be noted that a bit error rate is just one measurement of error condition. Many different ways of quantifying error performance, such as CRC error, checksum errors, etc., may be deployed as a performance measure for a transmission link without departing from the scope and spirit of the present technology.

It should also be noted that the window of error measurement may be indefinitely long living, for example, it may be cleared after a programmable duration where the application tag is no longer seen (i.e., stale entry), or it may be cleared after a fix user programmable duration regardless of activity. The criteria may be determined in accordance to the requirements of an application or the intended purpose of a user/administrator.

In some embodiments quarantined data may be logged in NVRAM or exported to collector for Quality Assurance reproduction, debug and fix.

In some embodiments, the retransmit request, for error repeatability verification, sent by a receiving entity/device may involve retransmission of stream of N packets. In some embodiments, examination of application-specific traffic streams for the determining the extent of error contribution from individual source application may be initiated upon link error condition exceeding an error tolerance of a particular transmission link. Alternatively, application-specific traffic error monitoring may be initiated/triggered in accordance to other relevant performance parameters, or in response to an occurrence of an external trigger, derivation of histogram, average and other statistical charts, or a user specified condition. It is understood that application-specific traffic error monitoring may be initiated/triggered in accordance to a variety of criteria as would be apparent to a person of ordinary skill in the arts.

In some embodiments of the present technology, frame data quality may comprise parameters such as temperature, payload pattern, voltage, time of occurrence, cable manufacture, aging, wear and tear, stress, humidity, location, altitude, etc. Preserving of exact data payload and frame quality parameters is valuable for reproducing, debugging and fixing link faults and connectivity issues. In some embodiments, heuristics/machine learning techniques may be applied to collected information on faulty application payload data patterns implicated in link failures in conjunction along with collected frame quality data parameters (that may include location/height/humidity/temperature information) to thereby provide an effective analytics-based tool for discovery of physical resource problems impacting application traffic, while also achieving high link utilization.

As previously described, quality of a transmission link may be impacted by such factor as, age and wear of hardware, environmental conditions to which link hardware or traversing signals may be subject (i.e., temperature and/or voltage) and in certain cases the receivers on either side or along the transmission link. Certain bit patterns in the payload of an application data frame may be more susceptible to experiencing signal attenuations, during the transition across a link subject to the aforementioned conditions. This bit-pattern dependent attenuation may result in one or more bit flips in the payload of application data frames thus causing link errors that to varying degrees may bring down the average or aggregate error rate of the link. For example, a connectivity protocol such as Ethernet as has an allowed error tolerance that corresponds to 10e-12 bit errors in a second (BER of $10^{-12}$). Therefore, according to an embodiment of the present technology, when observed rate of bit errors on an Ethernet link exceeds the aforementioned threshold amount, inspection of application specific traffic may be triggered in order to determine if the observed error condition is caused by particular application data traffic. By utilizing metrics that are based on determination of average error over time such as BER or standard deviation of error, an application's throughput rate or size of the payload in a transmission frame will not factor into the quantification of the error condition on the link.

Figure 4:
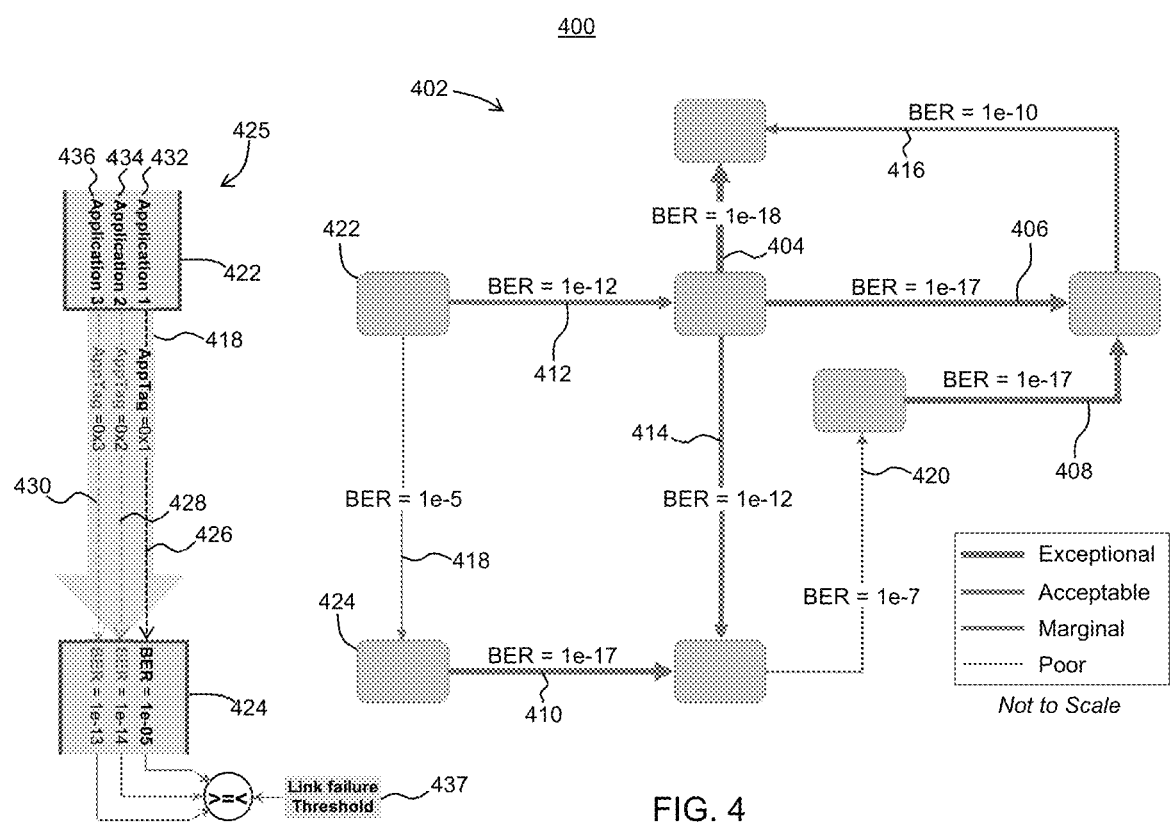
FIG. 4 illustrates a relevance of application level monitoring and error management of transmission links for improving connectivity performance and link utilization, in accordance to one embodiment of the present technology.

FIG. 4 represents an exemplary Bit Error Rate map 400 used for illustrating a performance of transmission links in exemplary network 402. In the exemplary Bit Error Rate map 400, performance of different transmission links are indicated by a Bit Error Rate (BER) parameter. Furthermore, for illustration purposes, link quality, ranging from Exceptional to Poor, is indicated by the width of the line representing a link. If the exemplary network 402 is taken to represents an Ethernet network, and the link error threshold condition is set according to Ethernet link fault tolerance, which in terms of BER may be represent as $1\times10^{-12}$ then Ethernet links 404, 406, 408 and 410 with BER levels far below Ethernet BER threshold of $1\times10^{-12}$, are indicated as exceptional. Ethernet links 412 and 414 with BER levels right at the Ethernet BER tolerance threshold are indicated as acceptable. Ethernet link 416 with BER moderately below Ethernet BER tolerance threshold is indicated as marginal and Ethernet links 418 and 420 with BER far above fault tolerance threshold of Ethernet are indicated as poor.

In reference to exemplary network 402, under BER conditions as annotated in FIG. 4, existing standards would call for shut down and subsequent replacement of links 418, 420 and 416 due to excessive BER. However, applying techniques and methods disclosed in accordance with some embodiments of the present technology, to network 402 may significantly improve the outcome in terms of network utilization and up time. This may be better illustrated through expanded view 425 representing link 418 as it would be implemented under application-aware error management and recovery techniques disclosed in accordance to embodiment of the present technology.

In accordance to embodiments of the present technology, a BER of $1\times10^{-05}$ on Ethernet link 418 established between devices 422 and 424 may never be observed because the condition will be corrected as the BER exceed the tolerance threshold of the link, which in case of Ethernet link 418 would correspond to $1\times10^{-12}$. As illustrated in 425, under disclosed embodiments of the present technology, aggregate traffic traversing link 418 may be differentiated as transmission streams 426, 428 and 430 associated with source applications 432, 434 and 436, respectively. As the observed BER on link 418 exceed the link's failure threshold 437 (for example as it exceeds BER level of $1\times10^{-12}$ or perhaps as it reaches a BER level of $1\times10^{-11}$, in case of an Ethernet link) application level BER monitoring of data traffic across 418 will be initiated to thereby track link errors associated with each individual application traffic as identified by a corresponding application tag.

With reference to view 425 of transmission link 418, application level tracking of link errors will identify traffic flow 426 sourced from application 432 as the primary cause of failure for link 418. As such corrective actions to alleviate the error condition on the link will be directed at the application 432 instead of involving the entire link which would disrupt traffic from non-offending applications. The corrective action may comprise moving application 432 to a different virtual or physical device or rerouting application traffic 426 to take a different path to 424. Corrective action may also include modifying the bit pattern associated with application traffic 426 in such a way so as to remove the resulting error condition. In either case without contribution of the offending application traffic 426 the condition of the link will improve immediately to exceptional or at worst acceptable as indicated by the link quality index in FIG. 4.

If application-aware error monitoring and recovery, in accordance to some embodiments of the present technology, is not implemented in case of the exemplary network 402, error conditions commensurate with annotated BER levels will result in swapping or replacement of link 418, which would unnecessarily take down connectivity for applications 436 and 434. This situation would also apply to links 420 and 416 having BER in excess of the allowed threshold. However, if an application-aware error monitoring and recovery algorithm, in accordance to embodiments of the present technology, is implemented, transmission links burdened by specific application traffic, such as 418, would recover automatically.

In some embodiments, a plurality of application tags may be used in combination, or one or more application tags may be used in combination with user defined payload data to enable a more granular combination and filtering of the traffic (i.e., application tag maybe used in combination with hypertext transfer protocol port numbers.)

Figure 5:
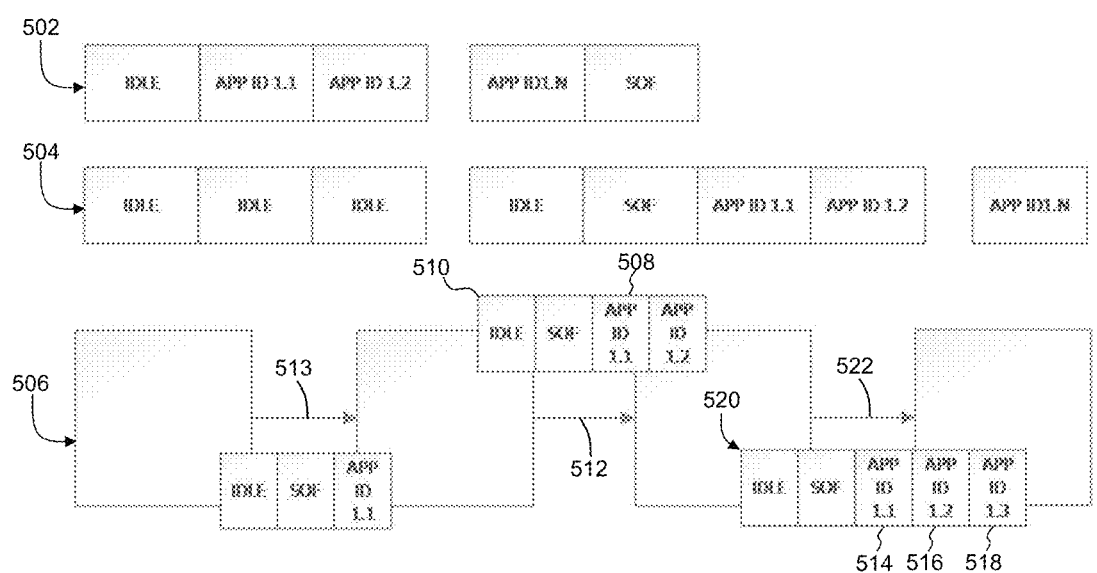
FIG. 5 illustrates exemplary approaches directed to utilizing application tags for identifying applications-specific traffic flows, in accordance to some embodiment of the present technology.

In some embodiments, the application tag may be inline and grow the data frame rather than preceding the Start of Frame indicator if the user so desires as shown in FIG. 5. In referencing FIG. 5, a packet/frame may have more than one application tag that may replace IDLE primitive(s) as shown by exemplary instance 502, or inserted within the frame as shown by exemplary instance 504.

Returning back to FIG. 5, in case of inline referring to a single packet, the associated tag may be a carryover (derived) by a previous link or a collection of N application tags derived from M previous links. For example, in the exemplary instance 506 illustrated in FIG. 5, application tag 508 in packet/frame 510 traversing link 512 is carried over (derived) from a previous link 513. Similarly collection of three application tags 514, 516, and 518 in packet/frame 520 traversing link 522 constitute carryovers from two previous links 512 and 513.

Figure 6:
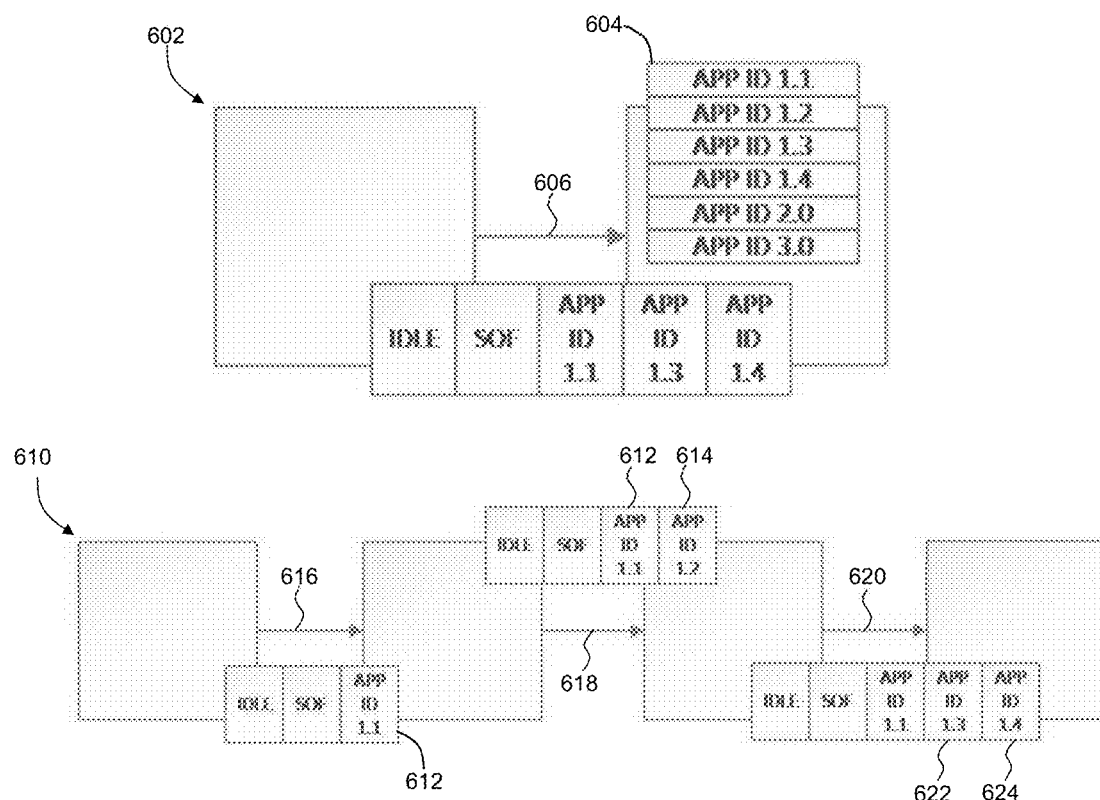
FIG. 6 illustrates exemplary ways of modifying data frames with application tags to facilitate application-specific traffic performance monitoring, in accordance to some embodiments of the present technology.

Selection of one or more N application tags may be used to update profile measurement of one or more error rates profiles as shown by exemplary depiction 602 in FIG. 6. 602 comprise a block 604 on the receiving side of the link 606. Block 604 reflects that multiple application specific traffic flows (as expressed by multiple application identifiers/tags) may be tracked (instantly or historically) for quality performance (i.e., error performance) depending on the number application identifiers present. As further illustrated by the exemplary representation 610 in FIG. 6, the plurality of applications identifiers may be nested, overlapping cascaded, added and/or replaced. For example, in referencing example 610 in FIG. 6, application tags 612 and 614 are added over the links 616 and 618 respectively. Application tag 614 is then deleted over link 620 while application tags 622 and 624 are added.

In some embodiments, Application tags corresponding to low error rate traffic flows (i.e., excellent Bit Error Rate) may be monitored and identified for the purpose of providing feedback to relevant operators that a link can be used for high priority, high importance, high value traffic due to the low error rate.

Disclosed system and method, in accordance to some embodiments of the present technology, in addition to increasing link utilization and up time across the entire network, will also facilitate a historical analysis of the link transitions across various quality grading (i.e., exceptional, poor, acceptable, marginal). This information, combined with an analysis of corresponding frame data and frame data quality parameters may facilitate a forensic understanding of network wide physical resource issues and link performance profile affecting application traffic.

In some embodiments, in scenarios corresponding to multiple traffic streams failing over a transmission link, a self-test mechanism may be deployed on the link to separately verify a link's error performance or quality prior to swapping a link or relocating all the link traffic. In some embodiments, self-test mechanism may involve transmission of a diagnostic test pattern over the link to verify existence of application independent error conditions on the link.

Some embodiments of the present technology are directed at a system and method for mitigating application payload related link failure. This may be accomplished by monitoring errors for each application specific transmission flow traversing a link. Identifying different application specific transmission flows maybe accomplished by several different means namely, by making inferences based on an inspection of the information encapsulated in a packet. One exemplary method disclosed by the present technology includes insertion of an application tag inline with the data frame (transmission frame). In one embodiment, an inline application tag may replace an IDLE primitive in front of the SOF field of the frame. In this way no extra bandwidth is used up as a result of application tagging of data frames. Alternatively, application tagging of data frames may be accomplished by using an embedded in packet application tag instead of an inline application tag. Aspects of the present technology are directed to identification of distinct traffic streams traversing a link to thereby evaluate its relation to one or more error conditions observed on the link According to some aspects of the technology, once different transmission streams traversing the link are individually identified and monitored based on the corresponding source application, contributions of different application specific transmissions to the overall error condition observed on the link may be determined and corrective actions may be taken in response to the one or more application traffic identified as a main source of observed excessive errors resulting in link failure.

Excessive error contribution from a particular application traffic stream may be due to specific payload data pattern propagating over a link with non-ideal attributes or conditions. Once an application traffic stream that is disproportionately contributing to an observed link error condition is identified, corrective action may be taken to alleviate the error condition without having to take down the link. In one embodiment, corrective action may include an initial request for retransmission of the offending packet or stream of N packets to determine repeatability of the error condition. The initial request for retransmission may be sent by a receiving entity to a transmitting entity, in accordance to one embodiment. Other embodiments may involve an initial request for retransmission sent directly to a source application or to a separate management and control program.

When one or more specific transmissions are identified and confirmed as a cause of a link failure, subsequent corrective actions, as disclosed by one embodiment of the present technology, may include relocating application to a different server/Virtual Machine/container or updating relevant routing protocols to re-route/relocate the application traffic onto a different path, thereby keeping the link available for other transmission streams traversing the link.

In some embodiments, corrective actions may include modifying the payload data pattern of the one or more application specific data transmissions or recommending application data modification in such a way so as to improve a quality of propagation signal associated with the specific transmission. In other embodiments, corrective action may further include monitoring, storage and analysis of information associated with offending payload data patterns along with frame quality data parameters such as temperature, voltage, humidity, altitude, hardware manufacturers, etc. This information may be used to provide link analytics to facilitate prediction and planning of remedial or corrective actions.

According to some embodiments, a collector may be utilized to monitor, collect and process information associated with payload data patterns and frame data quality parameters to provide analytics insight. A collector, in accordance to one aspect of the embodiments, may also be used to influence application payload based on acquired knowledge of learned error data pattern. For example, a continuous stream of constant string of "zero" value reserved or padding payload fields can increase noise of a physical link such as a cable. That application if alerted can alternatively replace the cable noisy (i.e. reserved or padding) data with harmless random values; hence, immunize application from cable weaknesses.

According to some embodiments of the technology, collection of frame data quality and other forensic parameters may be triggered by application aware link errors and processed to provide exact location along with performance and condition characteristics of cloud-based or in-house data center. This information may then be dynamically disseminated to relevant operators to alert them of the exact location of cloud datacenter performance and condition characteristics without polling or continuous parameter streaming. According to one embodiment, edge computing may be used to ensure collector database receives useful information.

A link failure may be characterized as a condition whereby an error condition exceeds a predetermined threshold. One embedment implements Bit Error Rate (BER) as a parameter to indicate and quantify observed error condition on a transmission link. However, in alternative embodiment, BER may be replaced by other performance metrics such as minimum, maximum, average or standard deviation error counts. In some embodiments, error conditions may correspond to one or more user defined conditions or criteria.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    tagging, by a transmitting device, application-specific traffic from an application with a source application identifier which identifies the application;
    transmitting, by the transmitting device, network traffic, including the tagged application-specific traffic to a receiving device;
    saving, by the transmitting device, a copy of the application-specific traffic that was tagged and transmitted;
    initiating, by a receiving device, monitoring of link error conditions relative to the tagged application-specific network traffic; and
    in response to the monitoring the link error conditions, creating and sending, by the receiving device, a message with a tag associated with the monitoring to the transmitting device that tagged the application-specific traffic.

2. The method of claim 1, wherein the tagging includes adding one or more application tags inside one or more data frames corresponding to a specific application.

3. The method of claim 1, wherein the monitoring includes determining whether a link error condition exceed a target threshold.

4. The method of claim 3, wherein the link error condition at least includes a bit error rate tracked using a counter.

5. The method of claim 1, wherein in response to a link error condition of the link error conditions indicating a threshold is not met, creating and sending the message with a delete tag, wherein the delete tag indicates deleting of a least one packet of the copy of the application-specific network traffic.

6. The method of claim 1, wherein in response to a link error condition of the link error conditions indicating a threshold is met, creating and sending the message with a retransmission tag, wherein the retransmission tag indicates retransmitting of a least one packet of the copy of the application-specific network traffic.

7. The method of claim 6, further comprising:
in response to retransmission of the least one packet of the application-specific network traffic, determining a repeatability of the link error condition; and
creating and sending a message with a repeatable error tag, wherein the repeatable error tag indicates observed repeatable excessive error condition.

8. One or more non-transitory computer-readable media storing computer-executable instructions that, when executed by one or more processors, cause the one or more processors to:
tag, by a first processor, application-specific traffic from an application with a source application identifier which identifies the application;
transmit, by the first processor, network traffic, including the tagged application-specific traffic to a receiving device;
save, by the first processor, a copy of the application-specific traffic that was tagged and transmitted;
initiate, by a second processor, monitoring of link error conditions relative to the tagged application-specific network traffic; and
in response to the monitoring the link error conditions, create and send, by the second processor, a message with a tag associated with the monitoring to the the first processor that tagged the application-specific traffic.

9. The one or more non-transitory computer-readable media of claim 8, wherein the tagging includes adding one or more application tags inside one or more data frames corresponding to a specific application.

10. The one or more non-transitory computer-readable media of claim 8, wherein the monitoring includes determining whether a link error condition exceeds a target threshold.

11. The one or more non-transitory computer-readable media of claim 10, wherein the link error condition at least includes a bit error rate tracked using a counter.

12. The one or more non-transitory computer-readable media of claim 8, wherein in response to a link error condition of the link error conditions indicating a threshold is not met, the tag is a delete tag that indicates deleting of a least one packet of the copy of the application-specific network traffic.

13. The one or more non-transitory computer-readable media of claim 8, wherein in response to a link error condition of the link error conditions indicating a threshold is met, the tag is a retransmission tag that indicates retransmitting of a least one packet of the copy of the application-specific network traffic.

14. The one or more non-transitory computer-readable media of claim 13, comprising further instructions that, when executed by the one or more processors, cause the one or more processors to:
in response to retransmission of the least one packet of the application-specific network traffic, determining a repeatability of the link error condition; and
creating and sending a message with a repeatable error tag, wherein the repeatable error tag indicates observed repeatable excessive error condition \.

15. A system comprising:
a transmitting device configured to:
tag application-specific traffic from an application with a source application identifier which identifies the application;
transmit network traffic, including the tagged application-specific traffic to a receiving device; and
save a copy of the application-specific traffic that was tagged and transmitted;
a receiving device configured to:
initiate monitoring of link error conditions relative to the tagged application-specific network traffic; and
in response to the monitoring the link error conditions, create and send a message with a tag associated with the monitoring to the transmitting device that tagged the application-specific traffic.

16. The system of claim 15, wherein the tagging includes adding one or more application tags inside one or more data frames corresponding to a specific application.

17. The system of claim 15, wherein the monitoring includes determining whether a link error condition exceeds a target threshold.

18. The system of claim 15, wherein in response to a link error condition of the link error conditions indicating a threshold is not met, the tag is a delete tag that indicates deleting of a least one packet of the copy of the application-specific network traffic.

19. The system of claim 15, wherein in response to a link error condition of the link error conditions indicating a threshold is met, the tag is a retransmission tag that indicates retransmitting of a least one packet of the copy of the application-specific network traffic.

20. The system of claim 18, wherein the receiving device is further configured to:
in response to retransmission of the least one packet of the application-specific network traffic, determining a repeatability of the link error condition; and
creating and sending a message with a repeatable error tag, wherein the repeatable error tag indicates observed repeatable excessive error condition.

\* \* \* \* \*